Aug. 30, 1966 E. W. PETERSON ETAL 3,269,140
TEMPERATURE SENSITIVE VALVE ARRANGEMENT
Filed July 10, 1964 2 Sheets-Sheet 2

INVENTORS
EUGENE W. PETERSON,
MICHAEL J. NAGY,
BY John M. Koch
ATTORNEY.

United States Patent Office 3,269,140
Patented August 30, 1966

3,269,140
TEMPERATURE SENSITIVE VALVE
ARRANGEMENT
Eugene W. Peterson and Michael J. Nagy, Santa Barbara, Calif., assignors to Santa Barbara Research Center, Goleta, Calif., a corporation of California
Filed July 10, 1964, Ser. No. 381,770
6 Claims. (Cl. 62—223)

This invention relates to a temperature sensitive valve arrangement for control of fluid flow and particularly to a valve which regulates the flow of cryogenic fluids required to maintain a desired cryogenic temperature.

Reliability, small size and low weight are very important in airborne refrigeration systems employing gas expansion cryostats. In airborne infrared detector systems, for example, it is necessary to maintain the detector at a narrow range of cryogenic temperatures without wasting refrigerant. Excessive flow of refrigerant also should be avoided to minimize cryostat noise generated by such flow and the refrigerant should be smoothly throttled to stabilize the temperature of the detector for more accurate and precise measurements of infrared radiation.

Accordingly, this invention provides and improves flow control valve for efficiently regulating the flow of fluids, particularly cryogenic fluids.

The arrangement according to this invention is characterized by a combination comprising a valve body having a valve seat member slidably mounted therein and a poppet valve slidable within a cavity in the valve seat member. A loaded coiled spring is compressively interposed between the body and valve seat member to bias the latter in one direction and the opposed end of the valve seat member is engaged by a bellows device pressure responsive to temperature variation. Motion of the bellows opposes the biasing of the coiled spring and, accordingly, the poppet valve is variably opened to allow fluid flow in response to the heat load impinging on the bellows. Specifically, as the bellows is warmed from a determined temperature level, it expands and pressure moves the valve seat member against the biasing action of the coiled spring to accommodate valve opening and increased fluid flow. Alternately, as the bellows loses heat it is physically contracted and the action of the coiled spring against the valve seat member biases the latter in the direction of closed position and flow through the arrangement is diminished. The invention is particularly directed to the controlled flow of a fluid which has been cooled to cryogenic temperatures and which has as its ultimate object the cooling of a device which provides optimum operation at a specific cryogenic temperature level. To maintain the device at that specific level, it is desirable to carefully meter the flow of cryogenic fluid thereto so that the heat dissipated by the device is carefully balanced by the amount of fluid which vaporizes as a result of thermal transfer from the load. Accordingly, it is desirable that the valve of the disclosed invention, being temperature responsive, both meter the flow of the cryogenic fluid and be controlled by the temperature level thereof. Thus, a particular feature of this invention is that the fluid being metered acts as the controlling agent in temperature level determination which thus controls the metering.

The invention will be described hereinafter by way of example and with reference to the accompanying drawing, wherein.

Figure 1:
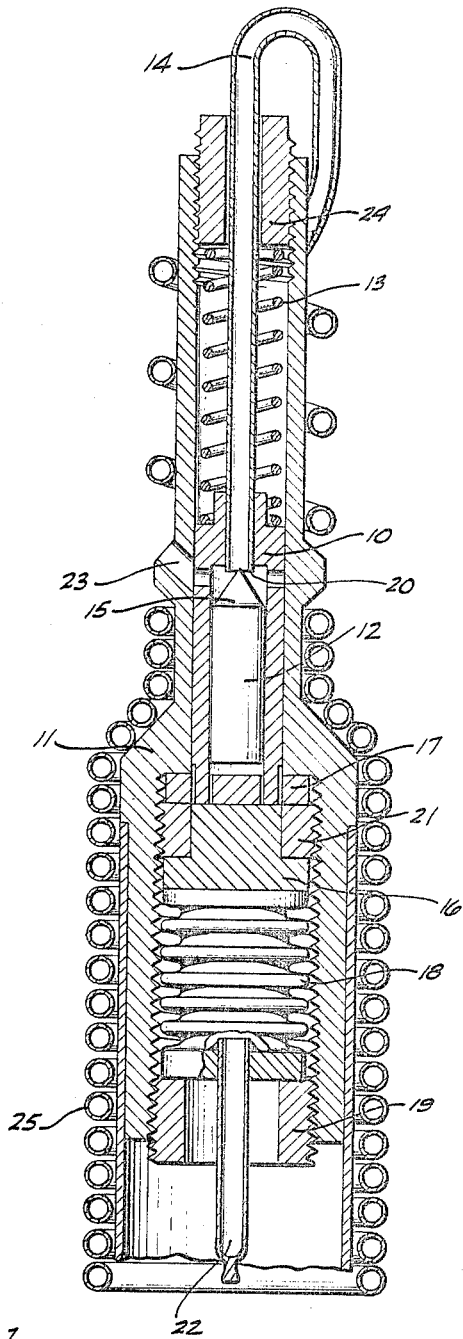
FIG. 1 is a longitudinal sectional view showing the valve arrangement of this invention enlarged about twenty times.
Figure 2:
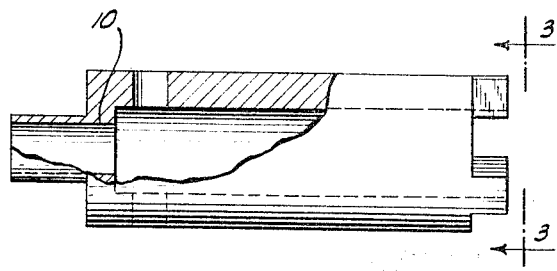
FIG. 2 is a side elevational view, drawn to an enlarged scale, of a valve seat member of the arrangement shown in FIG. 1.
Figure 3:
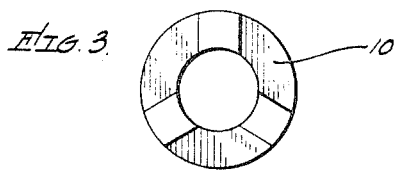
FIG. 3 is an end view of the valve seat member of FIG. 2 taken along line 3—3.
Figure 4:
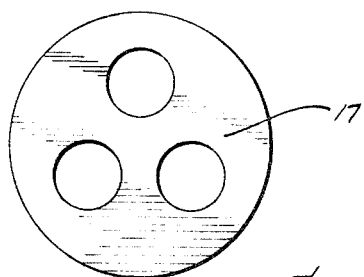
FIG. 4 is an end view, drawn to an enlarged scale, of a spider retainer of the arrangement shown in FIG. 1.

The arrangement shown provides a slide valve which is spring-loaded for movement in one direction and gas pressure loaded for movement in the opposite direction to smoothly open or close the valve for regulating the flow of cryogenic fluids to an infrared radiation detector cell and for maintaining the latter at a predetermined cryogenic temperature.

As shown in the drawings, a valve seat member 10 is slidably mounted in a valve body 11, and a poppet valve 12 is slidably mounted in the valve seat member 10. One end of the valve seat member 10 bears against a loaded coil spring 13 mounted in the valve body 11 and bearing against an adjusting screw 24 threaded into the valve body 11. The spring 13 is mounted around a valve input tube 14 extending through an aperture in the screw 24 and communicating with the inside of valve seat member 10, as shown. The other end of valve seat member 10 bears against a slidably mounted piston 16 through a spider 17. The piston 16, in turn, bears against a gas-filled, sealed bellows 18. The bellows 18 is retained against outward movement by a retainer 19 adjustably threaded into the valve body 11. The spider 17 is retained against outward movement by a spider retainer 21 threaded into the valve body 11. A sealed fill tube 22 extends through retainer 19 into the bellows 18. A valve exhaust 23 is formed through the valve body 11 and through the valve seat member 10 to communicate with the inside of the valve seat member 10 adjacent a valve seat 20 and a needle portion 15 of the poppet valve 12. The needle portion 15 is adapted to seat in the valve seat 20. The valve seat 20 is circular and has a sharp seating edge for the needle portion 15 which is conical. A cryostat heat exchanger coil 25 is spirally wound around the valve assembly to supply cold gas to the valve input tube 14 from the cryostat. The upper three turns of the coil 25 are loose so that the input tube 14 can move up and down with the valve seat member 10 which is integral with the input tube 14.

The valve, as shown in the drawing, is in the open position taken at the higher temperature situation. In this situation the pressure of the gas sealed in bellows 18 is relatively high, causing the bellows to expand. Expanding bellows 18 presses against piston 16 which, in turn, presses against valve seat member 10 pushing the valve seat member through spider 17 against loaded spring 13 so that poppet valve 12 is free to move away from the valve seat 20 under the pressure of incoming cold gas from the input tube 14. As the needle portion 15 of the poppet valve 12 unseats from the valve seat 20, cold gas from the input tube 14 passes through the valve exhaust 23 to the detector cell (not shown) and cools it below the cryogenic temperature at which it is desired to maintain it.

At this stage the lower temperature situation is brought about and the pressure of the gas sealed in the bellows 18 is relatively low, causing the bellows to contract under the compressive force of loaded spring 13 acting through the valve seat member 10 and piston 16. The valve seat member 10 is moved toward the spider 17 until the poppet valve 12 is held tightly between the spider 17 and the valve seat 20. As the needle portion 15 of the poppet valve 12 seats in the valve seat 20, the flow of cold gas through the valve exhaust 23 is shut off. With the flow of cold gas shut off to the detector cell a warming condition sets in. As the warming trend continues, the pressure of the gas sealed in the bellows 18 increases and the above-described cycle of events is repeated. As a result, a narrow, constant cryogenic temperature range at the detector cell is maintained.

It will be seen that the valve operates smoothly and reliably as it closes and opens to an extent depending upon the force balance between loaded spring 13, tending to close the valve, and the gas pressure in bellows 18, tending to open the valve. The pressure of the gas in bellows 18, in turn, depends upon the cryogenic temperature in the vicinity of the valve and detector cell, or other element being maintained at a substantially constant, desired, low temperature. Near the liquefaction point of the cryogenic gas, the differential pressure effect is most pronounced and the valve is thus most sensitively controlled when the temperature desired to maintain constant is near the liquefaction temperature of the gas in bellows 18.

By properly choosing the gas sealed in bellows 18 and the spring constant of spring 13 the controlled temperature range can be adjusted. Adjusting screw 24 is set to balance the force of spring 13 against that of bellows 18 on valve seat 15 at the selected temperature. The position of bellows retainer 19 is adjusted so that empty bellows 18 is just slightly compressed. Bellows 18 is not strong enough to retain fill pressure unless its length is restricted. Spider 17 serves to hold poppet valve 12 against valve seat 15 when the pressure of bellows 18 is low. Poppet valve 12 is captured between valve seat member 10 and spider 17, the force being supplied by spring 13.

The valve of this invention can be used to efficiently supply cryogenic fluid from a supply thereof to each of one or more cryostats. In the case of more than one cryostat, the valves to each cryostat serve to divide the gas flow among the cryostats in accordance to their need. Without such control, the coldest unit gets the largest amount of gas.

Many laboratory cryostats employ tanked cryogenic gases. In such laboratory cryostats, the valve of this invention can be installed within the cryostat and thereby, conserve gas. It is much more efficient to use such a valve than to use a pressure regulator in preventing overcooling and waste of gas.

Obviously many other modifications and variations of the present invention are possible in the light of the above teachings. It is therefore to be understood that within the scope of the appended claims the invention can be practiced otherwise than as specifically described.

What is claimed is:

1. In a temperature-sensitive valve arrangement for volumetric control of fluid flow therethrough,
    said fluid having a temperature level in the cryogenic range,
    the combination of a valve body member and a valve seat member mounted for movement relative to each other,
    a poppet valve carried by the members and movable relative to the valve seat member,
    the flow of fluid through the arrangement being responsive to the last-mentioned relative movement,
    spring means compressively interposed between the members and normally biasing same for movement relative to each other in one direction,
    an expansion and contraction device in pressured interposition between said members,
    said device being subject to expanding and contracting movements in response to the departure thereof from a determined temperature level,
    the expansion movement of said device being in opposition to said one direction movement between the members and the contraction movement of said device being complementary to said one direction movement between the members,
    fluid inlet and outlet port means communicating with the arrangement,
    and heat transfer means in direct thermal communication with the arrangement to vary the temperature level of the expansion and contraction device above and below said determined level and thereby control the flow of fluid through the arrangement.

2. A temperature-sensitive valve arrangement according to claim 1,
    wherein said heat transfer means comprises transfer tubing for carrying the fluid at cryogenic temperatures,
    one terminal of said transfer tubing communicating directly with said inlet port means.

3. A temperature-sensitive valve arrangement according to claim 2,
    wherein said transfer tubing comprises a plurality of coils surrounding the valve body member and in thermal transfer relation with said expansion and contraction device.

4. A temperature-sensitive valve arrangement according to claim 3,
    wherein said expansion and contraction device is a sealed bellows having a determined volume of the cryogenic fluid encapsulated therein.

5. A temperature-sensitive valve arrangement according to claim 4,
    wherein said tubing is integrally formed with said inlet port means,
    said inlet port means being movable with said one of said members,
    certain of said tubing coils being flexible to accommodate relative movement between said members.

6. A temperature sensitive valve for flow control of gas in an expanded gas refrigerator which comprises an elongate valve body including aligned oppositely projecting portions, a valve seat member slidably mounted in the valve body, an inlet port communicating with the valve seat member, a poppet valve member slidably mounted in the valve seat member, a loaded spring means mounted in one of the projecting portions of the valve body and bearing upon the valve seat member, adjustment means for setting the load upon the spring means, compressed bellows means mounted in the other projecting portion of the valve body and bearing upon the valve seat member in opposition to the loaded spring means, a valve seat carried by the valve seat member and comprising the terminal portion of the inlet port, a needle formed on the poppet valve member for seating in the seat, the forces of the spring means and the bellows means being substantially balanced in opposition to each other to urge the needle to substantially seat on the seat, a cryostat heat exchanger coil mounted around the valve body in heat exchange relationship therewith, communicating means for establishing communication between the cryostat heat exchanger coil and the valve seat member, and exhaust port means formed through the valve body and the valve seat member for exhaust of gas from the valve seat member to the exterior of the valve body when the poppet member is unseated.

References Cited by the Examiner

UNITED STATES PATENTS 2,506,724  5/1950  Lindgren _____ 236—99
2,805,039  9/1957  Angelery _____ 236—99

MEYER PERLIN, *Primary Examiner.*